United States Patent [19]
Washington

[11] Patent Number: 5,593,346
[45] Date of Patent: Jan. 14, 1997

[54] MEAT TENDERIZING MALLET

[76] Inventor: Dyral Washington, 1536 Arch St., Norristown, Pa. 19401-3529

[21] Appl. No.: 654,070

[22] Filed: May 28, 1996

[51] Int. Cl.[6] .................................................. A22C 9/00
[52] U.S. Cl. ................................................................ 452/146
[58] Field of Search ................................ 452/146, 141, 452/145, 147

[56] References Cited

U.S. PATENT DOCUMENTS

| | | | |
|---|---|---|---|
| D. 113,307 | 2/1939 | Hornbostel | 452/146 |
| 185,038 | 12/1876 | Mayfield | 452/146 |
| 307,802 | 11/1884 | Richmond | 456/146 |
| D. 481,170 | 11/1915 | Colley | 452/146 |
| 489,928 | 1/1893 | Carlson | 452/146 |
| 1,903,789 | 4/1933 | Michaels | 452/146 |
| 2,019,009 | 10/1935 | Hendrix | 452/146 |
| 2,396,020 | 3/1946 | Savage | 452/146 |
| 3,581,651 | 6/1971 | Johnson | 452/146 |

*Primary Examiner*—Willis Little

[57] ABSTRACT

A meat tenderizing mallet for use in association with meat and meat tenderizer fluid, the apparatus comprises a handle formed in an cylindrical configuration with an inboard end including screw threads; a mallet head having an open top, an open bottom and a bore formed therein, the bore adapted to be coupled to the inboard end of the handle, a lid being coupled to the open top of the mallet head; and a base plate having an outer surface and an inner surface, the outer surface having a plurality of generally pyramidal shaped protrusions, each protrusion including an aperture positioned therethrough, the inner surface of the base plate being coupled to the open bottom of the container, in an operative orientation a user filling the container with tenderizing fluid and striking the meat, this action causing injection of tenderizing fluid into the meat thereby facilitating meat tenderizing.

6 Claims, 2 Drawing Sheets

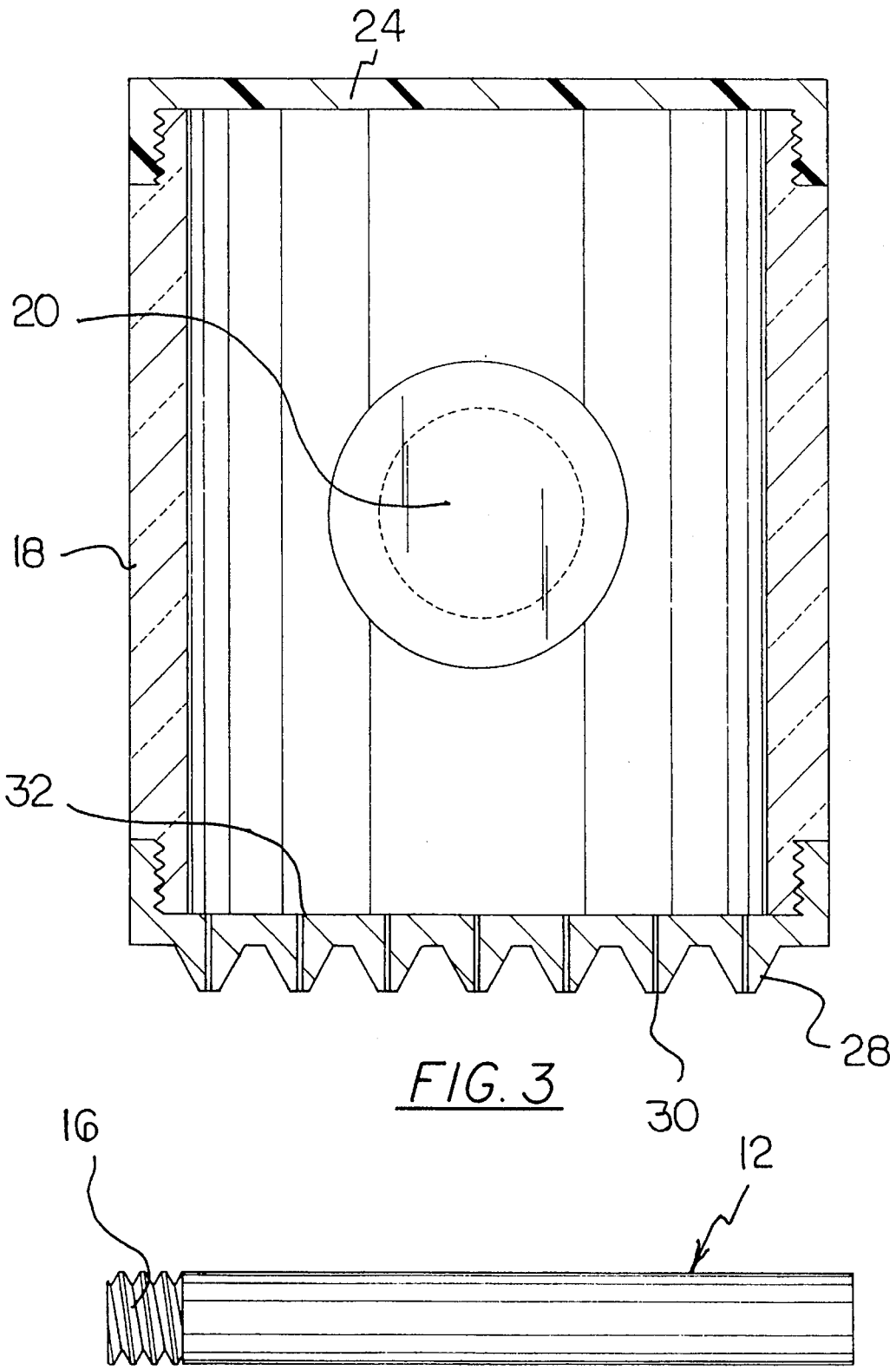

MEAT TENDERIZING MALLET

BACKGROUND OF THE INVENTION

1. Field of the Invention

The present invention relates to a meat tenderizing mallet and more particularly pertains to tenderizing meat by striking the meat with a mallet including protrusions with apertures to permit injection of tenderizing fluid into the meat.

2. Description of the Prior Art

The use of the meat tenderizers is known in the prior art. More specifically, the meat tenderizers heretofore devised and utilized for the purpose of tenderizing the meats are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,254,700 to Fleming discloses a domestic appliance for the liquid injection of the meat.

U.S. Pat. No. 4,380,850 to Coburn discloses a hand operated steak tenderizer and cuber.

U.S. Pat. No. Des. 291,762 to Collins, Sr. discloses a meat tenderizer.

U.S. Pat. No. Des. 265,281 to Bennett discloses a meat tenderizer.

U.S. Pat. No. Des. 261,089 to Mc Donnell et al. discloses a tenderizer.

U.S. Pat. No. Des. 253,155 to Jurida discloses a meat tenderizer.

While these devices fulfill their respective, particular objective and requirements, the aforementioned patents do not describe a the meat tenderizing mallet for tenderizing the meat by striking the meat with a mallet including protrusions with apertures to permit injection of tenderizing fluid into the meat.

In this respect, the meat tenderizing mallet according to the present invention substantially departs from the conventional concepts and designs of the prior art, and in doing so provides an apparatus primarily developed for the purpose of tenderizing the meat by striking the meat with a mallet including protrusions with apertures to permit injection of tenderizing fluid into the meat.

Therefore, it can be appreciated that there exists a continuing need for new and improved the meat tenderizing mallet which can be used for tenderizing the meat by striking the meat with a mallet including protrusions with apertures to permit injection of tenderizing fluid into the meat. In this regard, the present invention substantially fulfills this need.

SUMMARY OF THE INVENTION

In the view of the foregoing disadvantages inherent in the known types of the meat tenderizers now present in the prior art, the present invention provides an improved the meat tenderizing mallet. As such, the general purpose of the present invention, which will be described subsequently in greater detail, is to provide a new and improved the meat tenderizing mallet and method which has all the advantages of the prior art and none of the disadvantages.

To attain this, the present invention essentially comprises a new and improved meat tenderizing mallet for use in association with meat and meat tenderizer fluid, the apparatus comprising, in combination: a handle being fabricated of wood and formed in an elongated cylindrical configuration with an inboard end including external screw threads and an outboard end; a mallet head being fabricated of plastic and formed as a cylindrical container having an open top, an open bottom and a radially extending bore formed therein, the container further including indicia marked thereupon, the indicia being formed as a plurality of lines to permit a user to determine fluid volume levels, the bore containing internal screw threads and adapted to be coupled to the inboard end of the handle, a lid being formed in a planar circular configuration, the lid being threadedly coupled to the open top of the mallet head; and a base plate being fabricated of metal and formed in a generally circular configuration with an outer surface and an inner surface, the outer surface having a plurality of generally pyramidal shaped protrusions, each protrusion including an aperture positioned therethrough, the inner surface of the base plate being threadedly coupled to the open bottom of the container, in an operative orientation a user filling the container with tenderizing fluid and striking the meat, this action causing injection of tenderizing fluid into the meat thereby facilitating meat tenderizing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved the meat tenderizing mallet which has all the advantages of the prior art the meat tenderizers and none of the disadvantages.

It is another object of the present invention to provide a new and improved the meat tenderizing mallet which may be easily and efficiently manufactured and marketed.

It is a further object of the present invention to provide a new and improved the meat tenderizing mallet which is of durable and reliable construction.

An even further object of the present invention is to provide a new and improved the meat tenderizing mallet which is susceptible of a low cost of manufacture with regard to both materials and labor, and which accordingly is then susceptible of low prices of sale to the consuming public, thereby making such a the meat tenderizing mallet economically available to the buying public.

Still yet another object of the present invention is to provide a new and improved the meat tenderizing mallet which provides in the apparatuses and methods of the prior art some of the advantages thereof, while simultaneously overcoming some of the disadvantages normally associated therewith.

Even still another object of the present invention is to provide a new and improved the meat tenderizing mallet for tenderizing the meat by striking the meat with a mallet including protrusions with apertures to permit injection of tenderizing fluid into the meat.

Lastly, it is an object of the present invention to provide a new and improved the meat tenderizing mallet for use in association with meat and meat tenderizer fluid, the apparatus comprises a handle formed in an cylindrical configuration with an inboard end including screw threads; a mallet head having an open top, an open bottom and a bore formed therein, the bore adapted to be coupled to the inboard end of the handle, a lid being coupled to the open top of the mallet head; and a base plate having an outer surface and an inner surface, the outer surface having a plurality of generally pyramidal shaped protrusions, each protrusion including an aperture positioned therethrough, the inner surface of the base plate being coupled to the open bottom of the container, in an operative orientation a user filling the container with tenderizing fluid and striking the meat, this action causing injection of tenderizing fluid into the meat thereby facilitating meat tenderizing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the apparatus taken along section line 3—3 of FIG. 1.

FIG. 4 is an isolated perspective view of the handle of the apparatus.

The same reference numerals refer to the same parts through the various Figures.

DESCRIPTION OF THE PREFERRED EMBODIMENT

Figure 1:
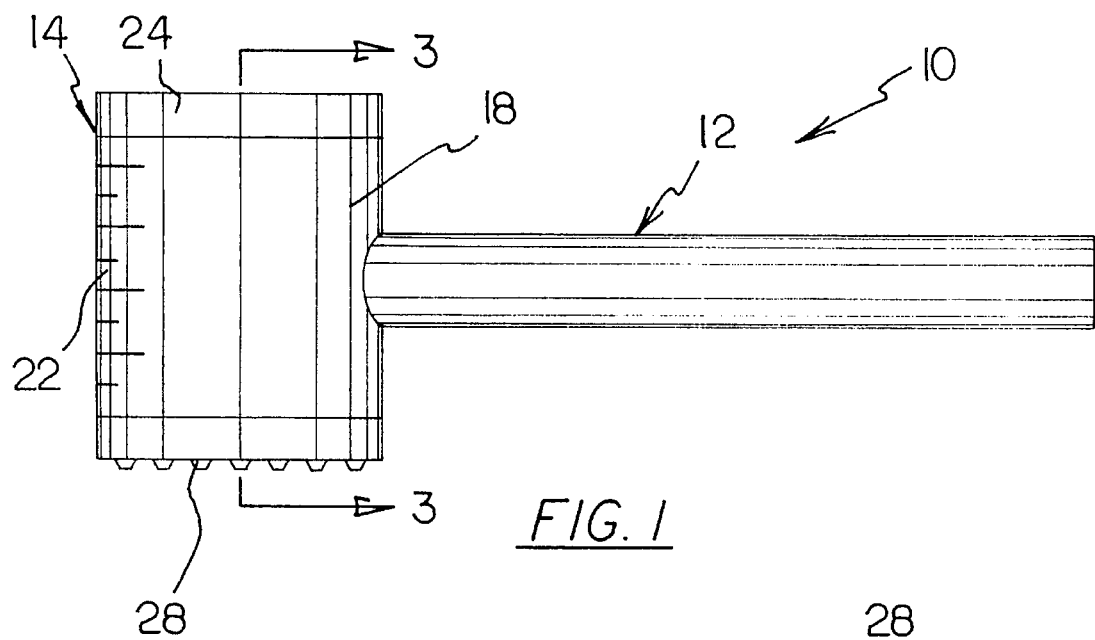
FIG. 1 is a perspective view of the preferred embodiment of the meat tenderizing mallet constructed in accordance with the principles of the present invention.

With reference now to the drawings, and in particular, to FIG. 1 thereof, the preferred embodiment of the new and improved the meat tenderizing mallet embodying the principles and concepts of the present invention and generally designated by the reference number 10 will be described.

Specifically, it will be noted in the various Figures that the device relates to a meat tenderizing mallet 10 for tenderizing meat by striking the meat with the mallet. In its broadest context, the device consists of a handle 12, a mallet head 14 and a base plate 15. Such components are individually configured and correlated with respect to each other so as to attain the desired objective.

The meat tenderizing mallet 10 is adapted for use in association with meat and meat tenderizer fluid. Different types of meat, such as steak can be used with the system. A user could purchase less expensive and tougher meats and tenderize them quickly and cheaply them with the apparatus. Different types of soup stock, as well as powdered meat tenderizer dissolved in water could be used as tenderizer fluid.

The handle 12 is fabricated of wood. The handle is formed in an elongated cylindrical configuration. The handle has an inboard end which includes external screw threads 16 and an outboard end. Note FIGS. 1 and 4.

The mallet head 14 is fabricated of plastic. In one embodiment of the apparatus the plastic is transparent. The mallet head is formed as a cylindrical container 18 with an open top and an open bottom. Both the top and bottom include external screw threads. A radially extending bore 20 is positioned in the center of the container. Note FIG. 1.

The container further includes indicia 22. The indicia are formed as a plurality of lines to permit a user to determine fluid volume levels. Since the mallet head is fabricated of plastic, the fluid level is visible through the mallet head. In an alternative embodiment of the apparatus numerals are positioned adjacent the lines. The bore contains internal screw threads and is adapted to be coupled to the inboard end of the handle 12. A lid 24 is formed in a planar circular configuration and includes internal screw threads. The lid is threadedly coupled to the open top of the mallet head. Note FIGS. 1 and 3.

Figure 2:
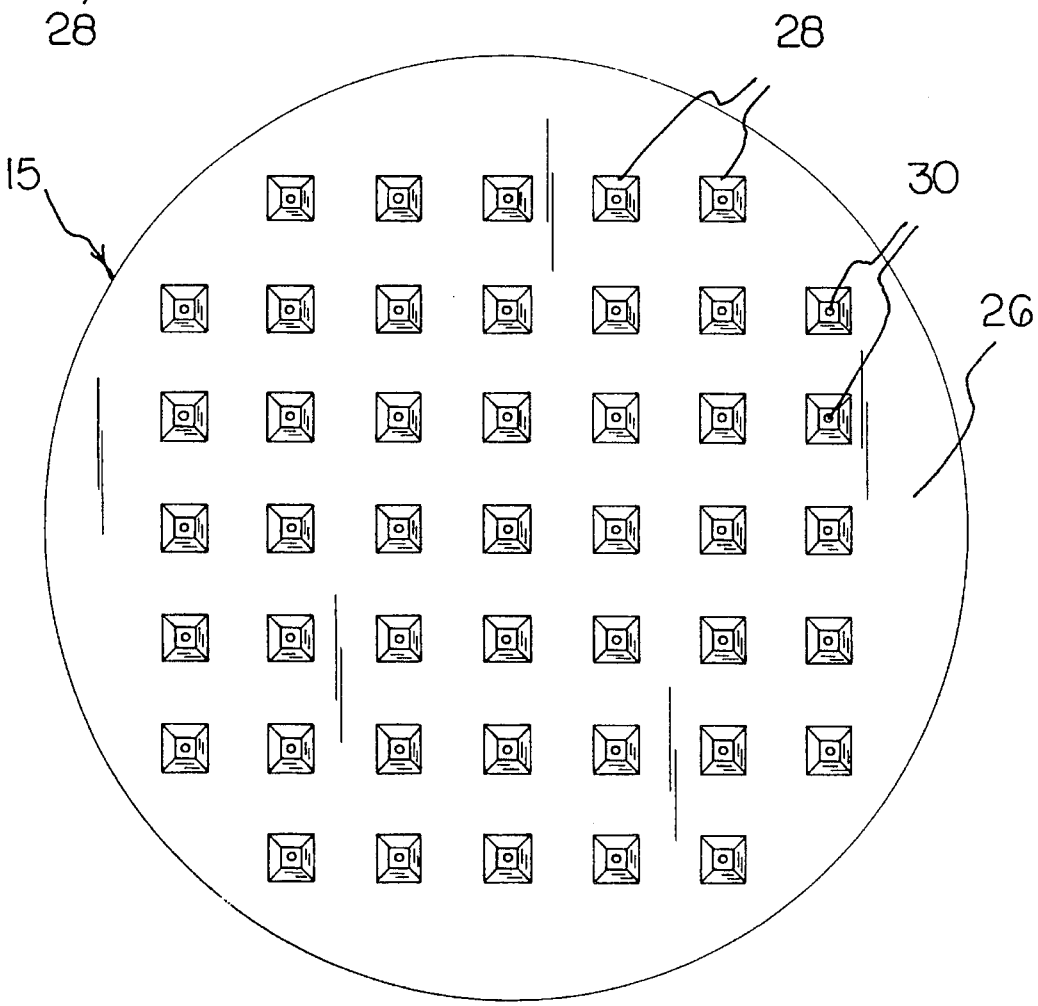
FIG. 2 is a bottom perspective view of the metal base plate illustrating the protrusions.

The base plate 15 is fabricated of metal. In the preferred embodiment the base plate is fabricated of stainless steel. The base plate is formed in a generally circular configuration with an outer surface 26 and an inner surface. The outer surface has a plurality of generally pyramidal shaped protrusions 28. In the preferred embodiment there are forty five protrusions positioned in rows and columns. Each protrusion includes a centrally positioned aperture 30. The inner surface 32 of the base plate is threadedly coupled to the open bottom of the container. Note FIGS. 2 and 3.

In an operative orientation a user fills the container 18 with tenderizing fluid and strikes the meat. The pressure of the impact of the mallet on the meat causes the injection of tenderizing fluid into the meat. The tenderizing fluid and the projections facilitate meat tenderizing. Note FIGS. 1 and 3.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved meat tenderizing mallet for use in association with meat and meat tenderizer fluid, the apparatus comprising, in combination:

a handle being fabricated of wood and formed in an elongated cylindrical configuration with an inboard end including external screw threads and an outboard end;

a mallet head being fabricated of plastic and formed as a cylindrical container having an open top, an open bottom and a radially extending bore formed therein, the container further including indicia marked thereupon, the indicia being formed as a plurality of lines to permit a user to determine fluid volume levels, the bore containing internal screw threads and adapted to be coupled to the inboard end of the handle, a lid being formed in a planar circular configuration, the lid being threadedly coupled to the open top of the mallet head; and a base plate being fabricated of metal and formed in a generally circular configuration with an outer surface and an inner surface, the outer surface having a plurality of generally pyramidal shaped protrusions, each protrusion including an aperture positioned therethrough, the inner surface of the base plate being threadedly coupled to the open bottom of the container, in an operative orientation a user filling the container with tenderizing fluid and striking the meat, this action causing injection of tenderizing fluid into the meat thereby facilitating meat tenderizing.

2. A meat tenderizing mallet for use in association with meat and meat tenderizer fluid, the apparatus comprising:

a handle formed in an cylindrical configuration with an inboard end including screw threads;

a mallet head having an open top, an open bottom and a bore formed therein, the bore adapted to be coupled to the inboard end of the handle, a lid being coupled to the open top of the mallet head; and a base plate having an outer surface and an inner surface, the outer surface having a plurality of generally pyramidal shaped protrusions, each protrusion including an aperture positioned therethrough, the inner surface of the base plate being coupled to the open bottom of the container, in an operative orientation a user filling the container with tenderizing fluid and striking the meat, this action causing injection of tenderizing fluid into the meat thereby facilitating meat tenderizing.

3. The meat tenderizing mallet as set forth in claim 2 wherein the container includes indicia marked thereupon, the indicia being formed as a plurality of lines to permit a user to determine fluid volume levels.

4. The meat tenderizing mallet as set forth in claim 2 wherein the container is formed in a generally cylindrical configuration and the lid and base plate are formed in a generally circular configuration.

5. The meat tenderizing mallet as set forth in claim 2 wherein the handle is fabricated of wood, the container is fabricated of plastic, and the base plate is fabricated of metal.

6. The meat tenderizing mallet as set forth in claim 5 wherein the container is transparent.

* * * * *